Dec. 18, 1962 N. H. HAENKY ET AL 3,068,903
COMBINATION VALVE
Filed April 9, 1959 2 Sheets-Sheet 1

INVENTORS
Norman H. Haenky and
Victor J. Haenky

BY Mason, Fenwick & Lawrence
ATTORNEYS

Dec. 18, 1962 N. H. HAENKY ET AL 3,068,903
COMBINATION VALVE
Filed April 9, 1959 2 Sheets-Sheet 2

INVENTORS
Norman H. Haenky, 3rd
Victor J. Haenky
BY Mason, Fenwick & Lawrence
ATTORNEYS

United States Patent Office

3,068,903
Patented Dec. 18, 1962

3,068,903
COMBINATION VALVE
Norman H. Haenky, 4418 S. Sandusky, and Victor J. Haenky, 624 N. Rockford, both of Tulsa, Okla.
Filed Apr. 9, 1959, Ser. No. 805,161
7 Claims. (Cl. 137—630.22)

This invention relates to plug type valves, and particularly to valves which are a combination of plug and check valves.

It is frequently desirable to control a fluid line by a positive acting plug type valve and, at the same time, use a check valve to prevent back flow in the line when the plug valve is open. This has necessitated the use of two valves, each acting in its normal manner to perform its customary function.

The general object of the present invention is to provide a combination valve which incorporates both a plug valve and a check valve.

A more specific object of the invention is to provide a valve of this nature wherein movement of the plug to open position will permit free operation of the check valve, and movement of the plug to closed position will also positively move the check valve to closed position.

Another object of the invention is to provide a combination valve in which the check valve will provide an additional seal when the plug of the valve is moved to closed position.

A further object of the invention is to provide such a valve wherein the check clapper disk is side mounted but freely swingable by gravity to closed position.

Still another object is the provision of a sealing ring for the clapper of a valve of this nature with means to relieve the pressure behind the ring to prevent the ring from being pulled from its seat when the clapper is moved from sealing position by pressure in the line.

Yet a further object is the provision of a combination plug and check valve in which the plug may move to close the line before the check valve is seated so that the check valve clapper will not be closed against full line pressure.

Another object of the invention is to provide a valve of the above-described nature with simple means for locking it in open or closed position.

Other objects of the invention will become apparent from the following description of preferred embodiments thereof, when taken in conjunction with the drawings which accompany, and form part of, this specification.

Figure 1:
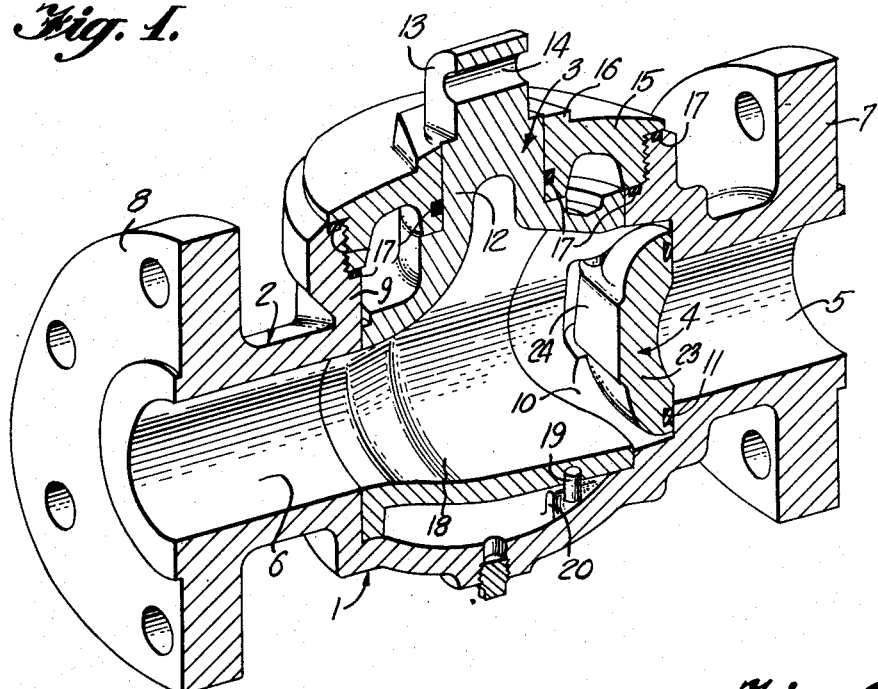
FIGURE 1 is a perspective view of a combination plug and check valve constructed in accordance with the present invention, the parts being broken away to show interior structure.

In general, the invention concerns a combination valve including a plug valve, which is manually operable to open and close a fluid line, and a check valve, automatically operable to prevent back flow in the line, with the check valve being positively seated by the plug valve as the plug valve is moved to closed position. The invention also includes certain specific structural arrangements of the valve.

Referring to the drawings in detail, there is shown a combination valve 1 having a body 2 in which is mounted a rotatable plug 3 and a check clapper 4. The valve is to be coupled in a fluid line having a normal flow from right to left as viewed in all of the figures of the drawings.

The body 2 is cored to provide the usual axially aligned inlet and outlet passages 5 and 6 with means at the ends of the body to connect to a fluid line. This may be coupling flanges 7 and 8, or any other conventional coupling means. The body is provided with a cylindrical cavity 9 to receive the plug 3, which cavity is at right angles to the inlet and outlet passages and has its axis intersecting the common axis of the inlet and outlet pasages. The plug cavity is recessed on the side toward the inlet passage to provide a check valve chamber 10. The inlet passage 5 opens into the check valve chamber 10 and the valve body has a flat face peripherally of the inlet passage forming a check valve seat 11.

The plug 3 is of general cylindrical shape, having a stem 12 of reduced diameter, and terminating at the top in a tool-receiving stud 13 having an opening 14 into which a tool, or bar, can be inserted to rotate the plug. A cap 15 fits over the plug stem and threads onto the valve body, or is otherwise attached thereto, to hold the plug in place in the plug cavity of the body. The cap may have a hexagonal projecting rim 16 upon which a wrench may be fit to tighten or loosen the cap. Suitable sealing rings 17 may be used as needed to prevent leakage between the cap and the valve body and the cap and the plug.

The plug is provided with a through port 18 for establishing communication from the inlet to the outlet passage when the plug is rotated to open position. Port 18 is substantially the diameter of the outlet passage at the end which communicates with the outlet passage when the valve is open, expands to substantially the width of the check valve chamber 10 at the other end. This will provide for smooth flow from the inlet to the chamber 10, and from the chamber through port 18 to the outlet. The plug has 90° of rotation to move from fully closed to fully open position, and the movement is limited to this extent by a pin 19 depending from the plug which contacts stop lugs 20 and 21 on the inside of the valve body.

Figure 2:
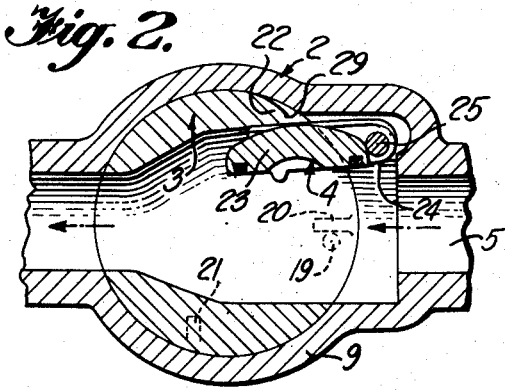
FIGURE 2 is a horizontal section through the valve, showing the plug and check valves in open position.
Figure 3:
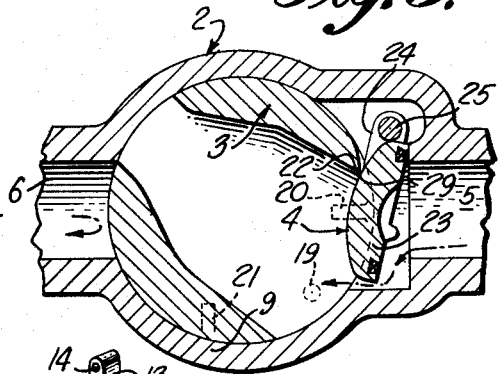
FIGURE 3 is a view similar to FIGURE 2 but showing the valve in partially closed position.
Figure 4:
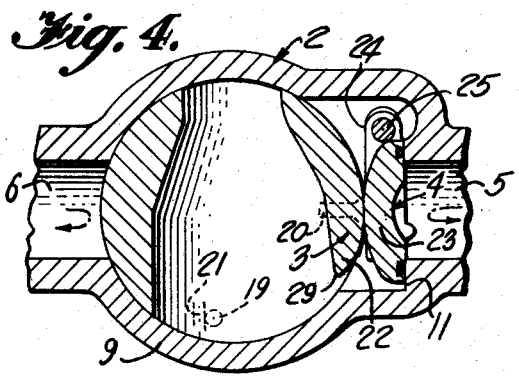
FIGURE 4 is a similar view in fully closed position.
Figure 5:
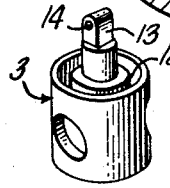
FIGURE 5 is a perspective view of the plug.

Referring particularly to FIGURES 2, 3 and 4, it will be noted that the wide end of the port 18 in the plug merges smoothly into the check valve chamber when the plug is in open position, but that the plug wall is cut back on one side to provide space in which the check clapper may freely swing and form a lip 22 which serves as an operating member to positively seat the check clapper as the plug is moved to closed position. This action will be described in detail later.

Figure 6:
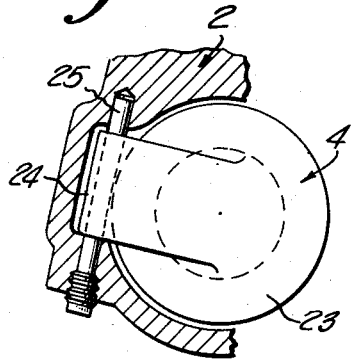
FIGURE 6 is a partial transverse section showing the side mounting of the check valve clapper.
Figure 10:
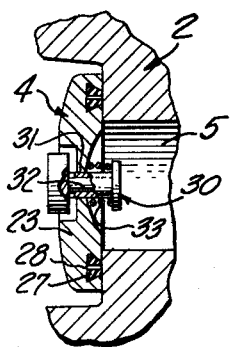
FIGURE 10 is a section through a modified clapper and associated structure wherein the clapper includes a relief valve.
Figure 7:
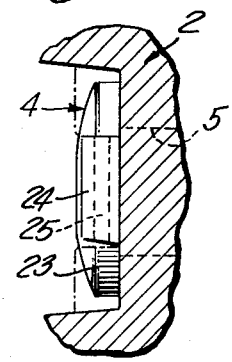
FIGURE 7 is a partial vertical section showing further details of the clapper mounting.
Figure 8:
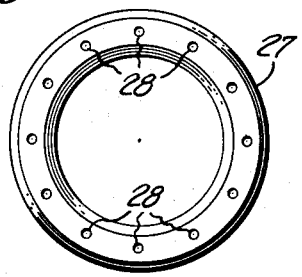
FIGURE 8 is an elevational view of the sealing face of the clapper with the special sealing ring which is used.
Figure 9A:
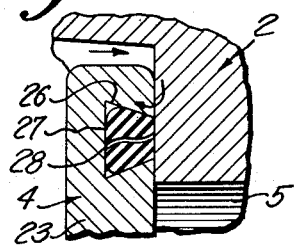
FIGURE 9a is an enlarged fragmentary section illustrating the action of the sealing ring under compression.
Figure 9B:
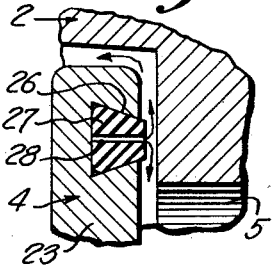
FIGURE 9b is a similar view with the sealing ring relieved of pressure.
Figure 11:
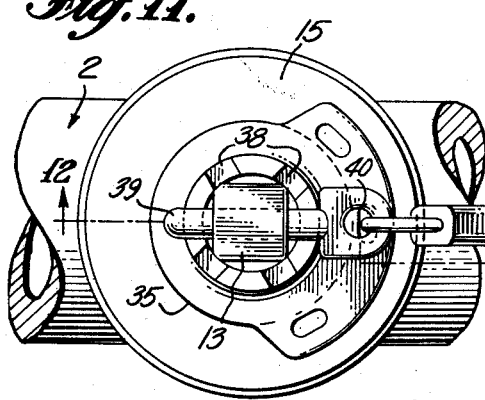
FIGURE 11 is a partial plan view of the valve body with a valve-locking cap in place thereon to prevent movement of the plug valve.
Figure 12:
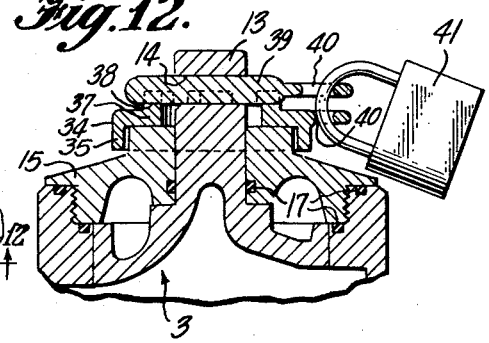
FIGURE 12 is a vertical section taken on the line 12—12 of FIGURE 11.
Figure 13:
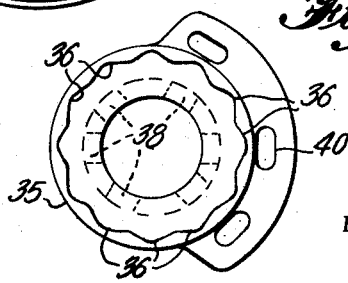
FIGURE 13 is a bottom plan view of the locking cap.

The check clapper is in the form of a circular valve member 23 having an offset mounting ear 24. The ear is bored and receives a pivot pin 25 which has its ends fitted in the valve body. The clapper does not have an overhead mount, as this would require the full weight of the clapper to be supported by the fluid pressure when the valve is open. The mounting is however offset from the vertical so that the valve will close by gravity as pressure is reduced or flow is reversed. This is clearly shown in FIGURES 6 and 7.

The face of valve member 23 has an annular groove 26 to seat a sealing ring 27. The ring is arranged to seal against the face of the valve seat 11 on the body. Due to the fact that the seal is made under considerable pressure, the sealing ring will frequently become twisted or warped when under seal and air will leak into the groove behind the ring. In order to bleed the groove, so that the ring will return to its proper seat in the groove when sealing pressure is relieved, the ring may be provided with a series of holes 28 spaced along it and extending completely through the ring.

Referring to FIGURES 2, 3 and 4, and first particularly to FIGURE 4, it will be noted that when the plug is turned to its fully closed position, that is with the axis of port 18 at right angles to the axis of the valve body passages, the plug wall will completely close off the outlet passage of the body, and the opposite wall of the plug will hold the check valve clapper firmly upon its seat. Thus, the plug serves as an actuating member to hold the clapper against its seat and form a primary seal for the valve. As the plug is rotated toward open position, the plug wall will move from contact with the clapper permitting the clapper to respond to line pressure. This position is shown in FIGURE 3. The opposite wall of the plug is still bridging the outlet passages, however, so the valve is closed. Continued movement of the plug will bring it to the position seen in FIGURE 2 where the outlet passage is fully open and the check valve clapper is free to move in accordance with line pressure. In reversing this movement the plug will cut off the outlet passage before the clapper is seated. This will permit pressure to equalize on both sides of the clapper so that little force is required to seat it. During the closing movement of the plug, the lip 22 at the port edge will bear upon the clapper to move it to closed position. It will be noted that the outer wall of the plug is machined adjacent the lip 22 to provide a cam surface 29 to contact the check clapper and force it gradually to its seat as the plug is turned to its fully closed position.

There are times when it may be desirable to bleed the clapper disk when in closed position so as to equalize pressure on opposite sides of the check valve. In installations where this is desired, a bleeder valve 30 may be provided centrally of the clapper disk. The disk will be apertured, as at 31, to receive the valve stem 32. A spring 33 will normally hold the bleeder valve in closed position.

Where the valve is to be left in open or closed position for relatively long periods of time it may be locked to prevent accidental or unauthorized operation. To this end, a lock cap 34 is provided. The cap has a depending flange 35 having a serrated inner face 36 to fit over and engage the apices of the hexagonal rim 16 of the valve body cap 15. The lock cap has an upstanding rim 37 having several pairs of radially disposed, diametrically opposed notches 38. A pair of notches 38 will be aligned with the opening 14 in the stem of the plug so that a locking pin 39 may be placed through the opening and seat in the notches. The pin and lock cap will have matching eyes 40 to receive the hasp of a padlock 41. This will effectively lock the plug against rotation relative to the valve body. The cap may have a plurality of locking openings 40, if desired, to permit locking the plug at various positions of adjustment without removing the cap.

While in the above practical embodiments of the invention have been disclosed, it will be understood that the precise details of structure shown and described are merely by way of example and the invention may take other forms within the scope of the appended claims.

What is claimed is:

1. A combination valve comprising, a valve body having a plug recess therein, an outlet port in the valve body communicating with the plug recess, a check valve chamber in the valve body opening to the plug recess and having a back wall spaced from the plug recess, an inlet port in the valve body opening in the back wall of the check valve chamber, a plug rotatably seated in the recess having a port providing communication between the outlet port and the check valve chamber when the plug is rotated to an open position and closing off communication between the outlet port and check valve chamber when the plug is rotated to a closed position, and a check valve clapper pivotally mounted in the check valve chamber so as to seat by gravity against the back wall of the check valve chamber and close the inlet port opening thereto, said clapper being mounted for swinging movement into the port in the plug when the plug is in open position, said clapper being substantially the depth of the check valve chamber from the back wall to the recess, whereby movement of the plug to closed position will positively seat said clapper against the back wall of the check valve chamber.

2. A combination valve as claimed in claim 1 wherein the plug has a lip at one side of said plug port to engage the clapper to move it to closed position.

3. A combination valve as claimed in claim 2 wherein said lip is positioned so as to permit the plug to close off communication with the outlet port before the clapper is completely seated against the back wall of the check valve chamber.

4. A combination valve as claimed in claim 1 wherein the clapper is provided with an annular groove to encircle the opening of the inlet port to the back wall when the clapper is seated against the wall, and a compressible sealing ring seated in the groove, said ring being perforated to provide for the escape of air which may be trapped in the groove.

5. A combination valve comprising, a valve body having a plug-receiving recess therein, an outlet port in the valve body communicating with the plug-receiving recess, a check valve chamber in the valve body and opening to the plug-receiving recess, an inlet port opening to the check valve chamber, a plug rotatably seated in the plug-receiving recess and having a port providing communication between the check valve chamber and the outlet port when the plug is rotated to one position, and a check valve clapper pivotally mounted in the check valve recess so that it will be movable by gravity to close the opening of the inlet port to the check valve chamber, the check valve clapper being mounted so that when it moves from a position closing the opening of the inlet port it moves into the port in the plug and may move from inlet closing position only when the port in the plug is in communication with the check valve chamber.

6. A combination valve comprising, a valve body having a plug-receiving recess therein, an outlet port in the valve body communicating with the plug-receiving recess, a check valve chamber in the valve body and opening to the plug-receiving recess, an inlet port opening to the check valve chamber, a plug rotatably seated in the plug-receiving recess and having a port providing communication between the check valve chamber and the outlet port when the plug is rotated to one position, and a check valve clapper pivotally mounted in the check valve recess so that it will be movable by gravity to close the opening of the inlet port to the check valve chamber, the plug being provided with a lip at the edge of the port therein to contact the check valve clapper and positively move the clapper to inlet port closing position when the plug is rotated so as to move the plug port from communication with the outlet port, said lip being positioned relative to the plug so that the plug will completely close communication with the outlet port before the lip moves the clapper to full closing of the inlet port.

7. A combination valve comprising, a valve body having a plug-receiving recess therein, an outlet port in the valve body communicating with the plug-receiving recess, a check valve chamber in the valve body and opening to the plug-receiving recess, an inlet port opening to the check valve chamber, a plug seated in the plug-receiving recess for rotation about a vertical axis and having a port providing communication between the check valve chamber and the outlet port when the plug is rotated to one position, a check valve clapper mounted upon a pivot which is spaced horizontal from the inlet port and inclined at a small angle from the vertical so that the valve clapper will swing in a horizontal direction by gravity to close the inlet port, and a lip at one side edge of the port in the plug to contact the check valve clapper and positively move the clapper to inlet port closing position when the plug is rotated so as to move the plug to outlet port closing position.

References Cited in the file of this patent

UNITED STATES PATENTS

| | | |
|---|---|---|
| 975,469 | Shaw | Nov. 15, 1910 |
| 1,322,721 | Noonan | Nov. 25, 1919 |
| 1,921,280 | Blake | Aug. 8, 1933 |
| 1,989,722 | Toelle | Feb. 5, 1935 |
| 2,016,997 | Hartke | Oct. 8, 1935 |
| 2,655,936 | Wexler | Oct. 20, 1953 |
| 2,748,794 | Dodds | June 5, 1956 |
| 2,930,400 | Wheatley | Mar. 29, 1960 |

FOREIGN PATENTS

| | | |
|---|---|---|
| 433,651 | France | 1911 |